(Model.)

G. A. BAZÉ.
Process of and Apparatus for Extracting Juice from Sugar Cane and other Vegetable Substances.

No. 243,487.  Patented June 28, 1881.

WITNESSES:
Chas. Nida
C. Sedgwick

INVENTOR:
G. A. Bazé
BY Munn & Co
ATTORNEYS.

UNITED STATES PATENT OFFICE.

GEORGE A. BAZÉ, OF HAVANA, CUBA.

PROCESS OF AND APPARATUS FOR EXTRACTING JUICE FROM SUGAR-CANE AND OTHER VEGETABLE SUBSTANCES.

SPECIFICATION forming part of Letters Patent No. 243,487, dated June 28, 1881.

Application filed November 12, 1880. (Model.)

*To all whom it may concern:*

Be it known that I, GEORGE A. BAZÉ, of Havana, Cuba, have invented a new and Improved Process and Apparatus for Extracting Juices from Sugar-Cane and Other Vegetable Substances, of which the following is a specification.

The object of this invention is to provide a process and apparatus whereby vegetable juices, such as those of sugar-cane and beet-roots, may be more cheaply and thoroughly extracted and in a more concentrated form.

The invention consists of an upright cylindrical vessel divided internally into two chambers by a perforated horizontal diaphragm, the upper chamber being designed for the reception of the crushed sugar-cane or other vegetable to be treated, and the lower chamber for the reception of the juices extracted therefrom; and it further consists of a central vertical shaft carrying suitable spiral stirrers for agitating the contents of the upper chamber; and it consists further in introducing steam under pressure into the closed chamber containing the vegetable substance, for the purpose of dissolving and extracting the juices and sugar therefrom, and in assisting the extraction by the operation of the stirrers, the extract being filtered or strained through the perforated diaphragm and drawn off from the lower chamber through suitable pipes.

Figure 1:
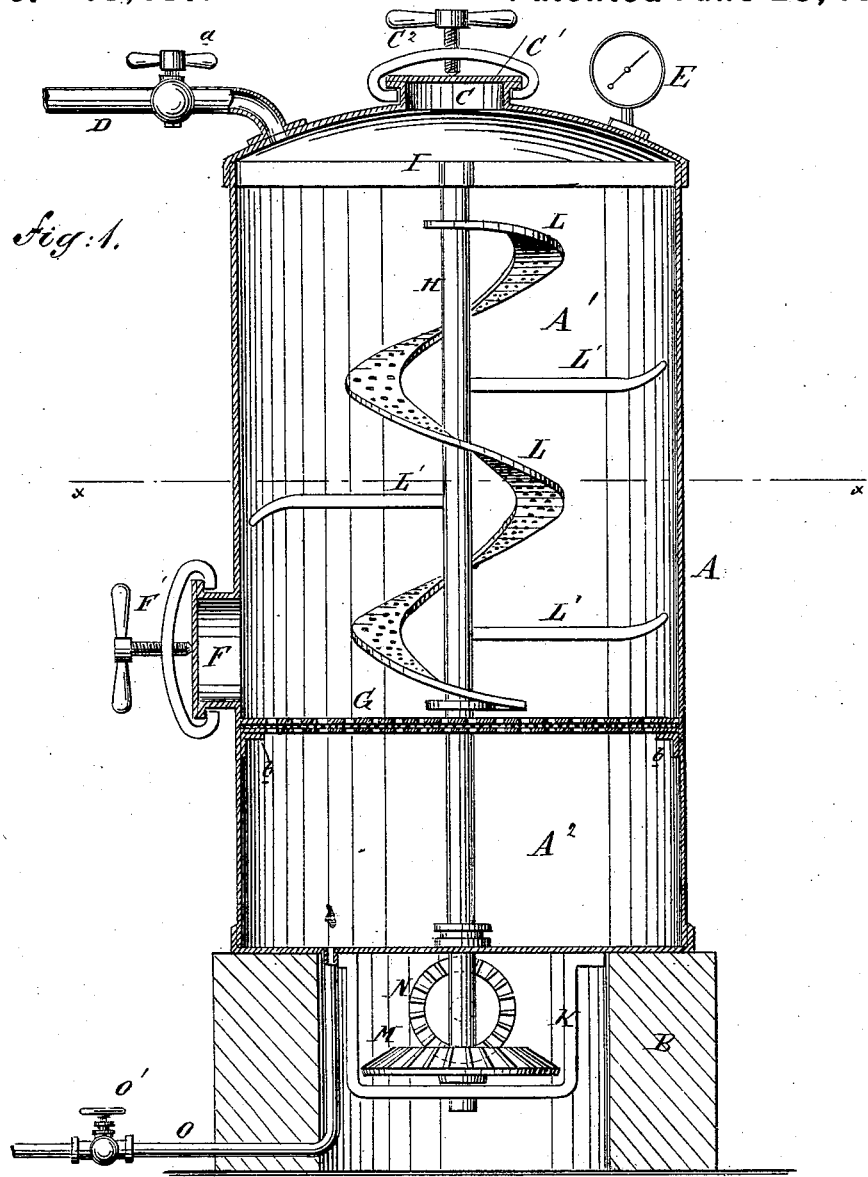
Figure 2:
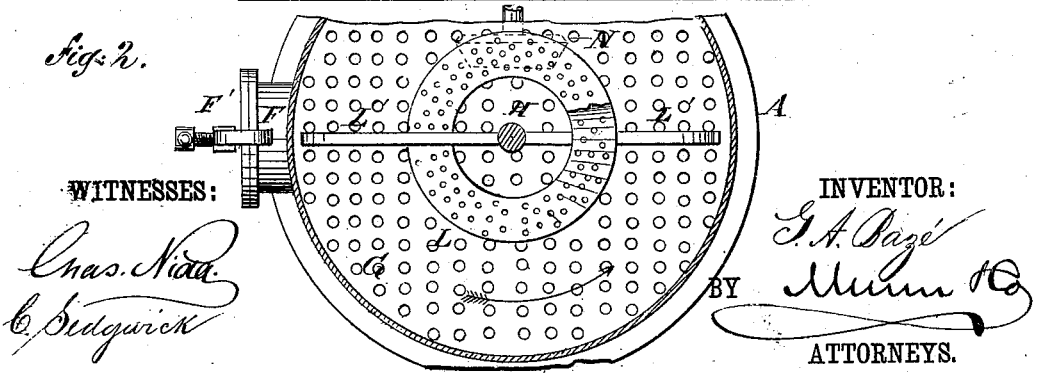

Figure 1 is a vertical sectional elevation of the device. Fig. 2 is a plan of the same on line *x x*, Fig. 1.

Similar letters of reference indicate corresponding parts.

In the drawings, A represents a cylinder set upright upon a suitable cylindrical support, B, which is preferably of brick or stone. Said cylinder A is provided on its top with a man-hole, C, whereby the substances to be treated are introduced, which man-hole C is closed in the usual manner by a plate or door, C', held down by clamp and screw C''. In the top of said cylinder A is also a steam-supply pipe, D, provided with a suitable cock or valve, *a*, for the ingress of steam into the cylinder A, and a steam-gage, E, for indicating the steam-pressure within the cylinder A, and in the side of the cylinder A, below its center, is a man-hole, F, for the discharge of the bagasse after the extraction of the sugar and the juices, which man-hole F is closed by suitable device, F'.

Within the cylinder A, below the man-hole F, about on a level with the bottom thereof, a perforated diaphragm, G, is supported on lugs *b*, that are secured on the inside of said cylinder A. Said diaphragm is preferably made of two perforated plates, placed face to face, with felt or some other filtering material between them, and divides the cylinder A interiorly into the chambers A' A², the upper one of which is designed to receive the vegetable substances to be treated, while the lower chamber, A², is to hold the extract therefrom for delivery through the discharge-pipe O that is provided with a suitable valve, O'.

H is the central vertical shaft fixed in the cylinder A, with its upper end journaled in the cross-brace I, beneath the man-hole C, and its lower end journaled in a suitable hanger, K, that depends from the bottom of the cylinder A. Fixed upon and about this shaft H in spiral form are perforated iron blades L and arms L', for agitating the contents of the chamber A' and assisting in the expression or extraction of the juices.

On the lower end of the shaft H is a bevel-gear wheel, M, into which gears a corresponding driving-gear wheel, N, through which power is transmitted for giving motion to the said shaft H.

In operating this device the crushed sugar-cane, beet-root, or other substance to be treated is introduced into the cylinder chamber A' through the man-hole C, and steam is then admitted into said chamber A' through the steam-pipe D. The shaft H is then put in motion in the direction of the arrow, Fig. 2, whereby the crushed cane, &c., is lifted and turned upward and the mass opened freely to the action of the steam, which penetrates through the mass under strong pressure and into and through the fibers and cells of the cane and thereby dissolves and extracts the saccharine matter and juices therein contained. The dissolved saccharine matter and juices then percolate through the diaphragm G into the chamber A², whence they are drawn through the discharge-pipe O for further treatment. The steam is then shut off by turning the valve *a* in the supply-pipe D, the man-hole F is opened, and the bagasse removed through it. The cylinder chamber A' may then be refilled and the juice-extracting operation continued.

This method of extracting the juices and saccharine matter from cane and other vegetable substances by steam-pressure yields a more concentrated extract than does the usual method of extracting them with water, and it is found, too, that the juices and saccharine matters are more completely extracted than by the old method.

Having thus fully described my invention, I claim as new and desire to secure by Letters Patent—

1. In an apparatus for extracting juices from sugar-cane and other vegetable substances, the combination, with the cylinder A, provided with steam-pipe D, of the perforated diaphragm G and shaft H, provided with stirrers L', substantially as herein shown and described.

2. In an apparatus for extracting juices from sugar-cane and other vegetable substances, the combination, with the revolving shaft H, of the perforated spirally-arranged plates L, substantially as herein shown and described, whereby the crushed cane is agitated and its juices expressed, as set forth.

GEORGE A. BAZÉ.

Witnesses:
I. I. STORER,
C. SEDGWICK.